(12) United States Patent
Powell

(10) Patent No.: US 11,096,856 B1
(45) Date of Patent: Aug. 24, 2021

(54) PHYSICAL THERAPY SYSTEM

(71) Applicant: Heather Powell, Monroe, CT (US)

(72) Inventor: Heather Powell, Monroe, CT (US)

( * ) Notice: Subject to any disclaimer, the term of this patent is extended or adjusted under 35 U.S.C. 154(b) by 533 days.

(21) Appl. No.: 16/052,567

(22) Filed: Aug. 1, 2018

(51) Int. Cl.
| | |
|---|---|
| *G09B 15/06* | (2006.01) |
| *G09B 13/00* | (2006.01) |
| *A61H 1/02* | (2006.01) |
| *A63B 23/00* | (2006.01) |
| *A63B 21/00* | (2006.01) |
| *G09B 19/00* | (2006.01) |

(52) U.S. Cl.
CPC .............. *A61H 1/02* (2013.01); *A63B 21/00* (2013.01); *A63B 23/00* (2013.01); *G09B 13/00* (2013.01); *G09B 15/06* (2013.01); *A61H 2201/0157* (2013.01); *A61H 2201/0161* (2013.01); *G09B 19/00* (2013.01)

(58) Field of Classification Search
None
See application file for complete search history.

(56) References Cited

U.S. PATENT DOCUMENTS

| | | | |
|---|---|---|---|
| 6,338,311 B1 * | 1/2002 | Ho ........................ | E01F 9/688 |
| | | | 116/63 C |
| 9,493,919 B2 * | 11/2016 | Handy .................... | E01F 9/688 |

* cited by examiner

*Primary Examiner* — James B Hull
(74) *Attorney, Agent, or Firm* — Gulf Coast Intellectual Property Group

(57) ABSTRACT

A physical therapy system that includes an apparatus coupled with a plurality of techniques of use thereof. The physical therapy system includes an apparatus having a body that is manufactured from a plurality of segments. The segments comprising the body are slidably coupled and configured to telescopically move so as to provide a collapsed position and an extended position with further providing of intermediate positions. The body of the physical therapy apparatus has a bottom end and a top end wherein the body has a narrowing diameter from the bottom end to the top end. The physical therapy system further includes preferred techniques of use that include but are not limited to picking up the apparatus, walking around the apparatus, disassembly and reassembly of the system, walking to a plurality of apparatus and reaching for the apparatus. Further techniques include placing a foot on top of the apparatus.

6 Claims, 6 Drawing Sheets

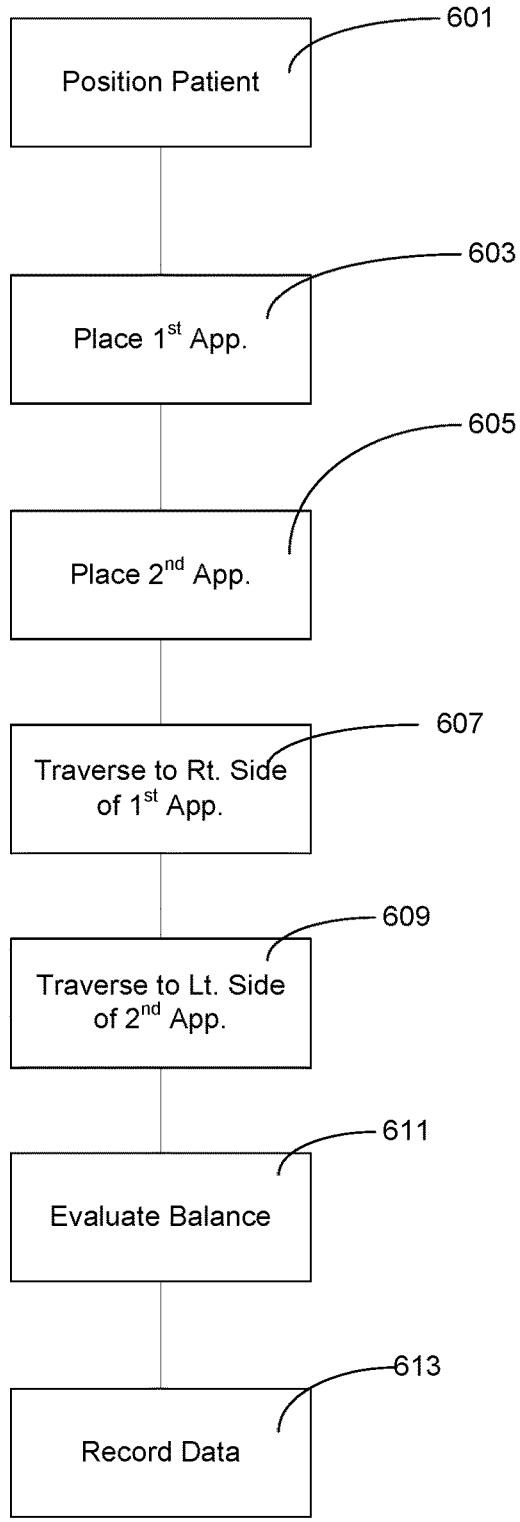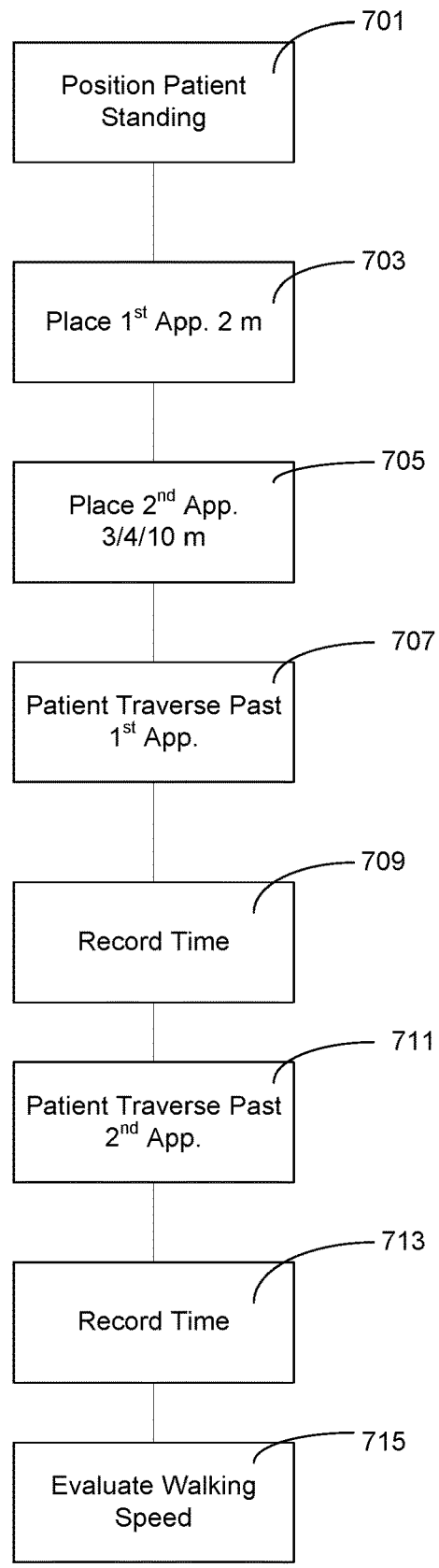
FIG. 7
FIG. 8

PHYSICAL THERAPY SYSTEM

FIELD OF THE INVENTION

The present invention relates generally to patient rehabilitation, more specifically but not by way of limitation, a portable physical therapy system incorporating an apparatus and techniques of use thereof that is designed to facilitate numerous tests wherein a practitioner can observe and objectively evaluate a patient to create a plan of care and use the apparatus for various interventions for the patient.

BACKGROUND

Millions of individuals require physical therapy every year in the United States. Whether a patient suffers from a chronic condition or is recovering from a surgical procedure, physical therapy is often prescribed as part of a treatment plan for the patient. Physical therapy can be an assigned group of exercises designed to build strength and/or improve a function such as but not limited to balance. A patient's physical therapy can be self-conducted and/or executed with the assistance of a physical therapist. A patient will sometimes visit a physical therapy clinic wherein a practitioner will utilize various equipment to perform physical therapy while many other patients receive physical therapy in their homes when it is a difficult effort for the patient to leave their home to travel to a therapy clinic.

One issue with home-based physical therapy is the limited amount of equipment that a practitioner can bring to utilize with the patient. Much of the modern physical therapy equipment cannot be transported by an individual as the design thereof requires installation in a clinic or the transportation of the conventional equipment presents a burden for the therapists. When delivering physical therapy, whether home-based or alternate location, it is common to evaluate a patient for impairments and functional limitations such as but not limited to gait and balance to determine how the patient presents initially, progression and achievement of the goals set forth for the patient. Furthermore, exercise and activities designed to improve functions such as but not limited to gait and balance can be administered by the physical therapist. The availability of easily portable physical therapy devices to assist with the aforementioned is limited.

Accordingly, there is a need for a portable physical therapy apparatus that can be utilized by a practitioner for home-based or alternate location physical therapy wherein the apparatus provides facilitation of examination and intervention routines.

SUMMARY OF THE INVENTION

It is the object of the present invention to provide a physical therapy apparatus that is easily portable wherein the apparatus is configured to be superposed a floor during use by a patient.

Another object of the present invention is to provide a portable physical therapy apparatus configured to be utilized in examination and intervention for a patient wherein the apparatus includes a body that is adjustable in height.

A further object of the present invention is to provide a physical therapy apparatus configured to be utilized in home-based or alternate suitable location physical therapy wherein the body includes a plurality of segments.

Still another object of the present invention is to provide a portable physical therapy apparatus configured to be utilized in examination and intervention for a patient wherein the plurality of segments of the body are slidably coupled and telescoping.

An additional object of the present invention is to provide a physical therapy apparatus configured to be utilized in physical therapy wherein the apparatus is incorporated into a plurality of tests designed to either examine or improve a patient's abilities.

Yet a further object of the present invention is to provide a portable physical therapy apparatus configured to be utilized in examination and intervention for a patient wherein the body is manufactured from a lightweight material such as but not limited to plastic.

Another object of the present invention is to provide a physical therapy apparatus configured to be utilized in physical therapy based in the home or alternate location wherein the body of the apparatus is configured to alternate heights depending upon parameters such as but not limited to the type of test being performed and the height of a common obstacle in which the patient may need to be able to negotiate in their environment.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 7 is a flowchart of an additional exemplary method of use of the present invention; and FIG. 8 is a flowchart of an additional exemplary method of use of the present invention.

DETAILED DESCRIPTION

Figure 1:
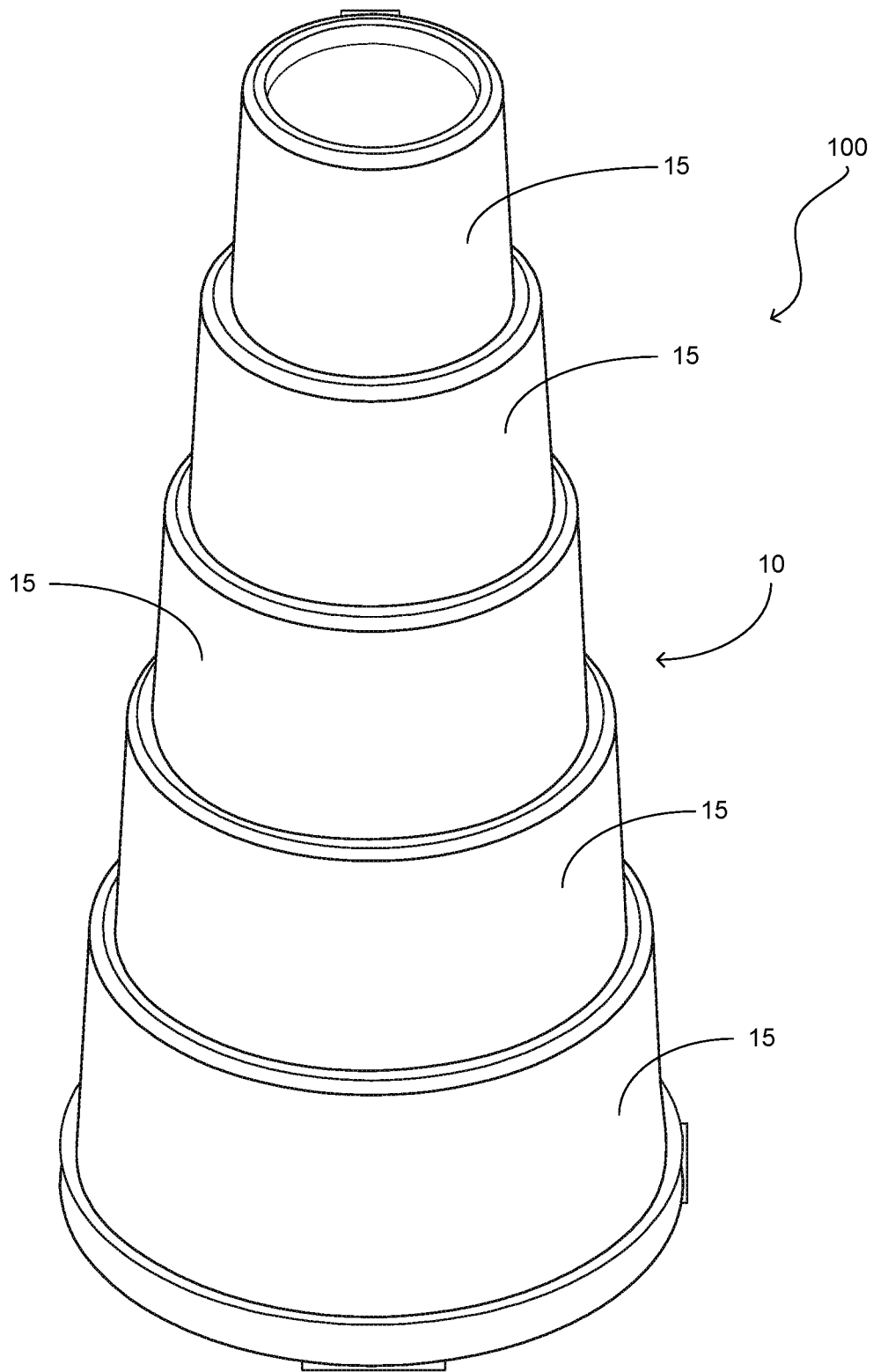
FIG. 1 is a perspective view of the present invention in an extended position.
Figure 2:
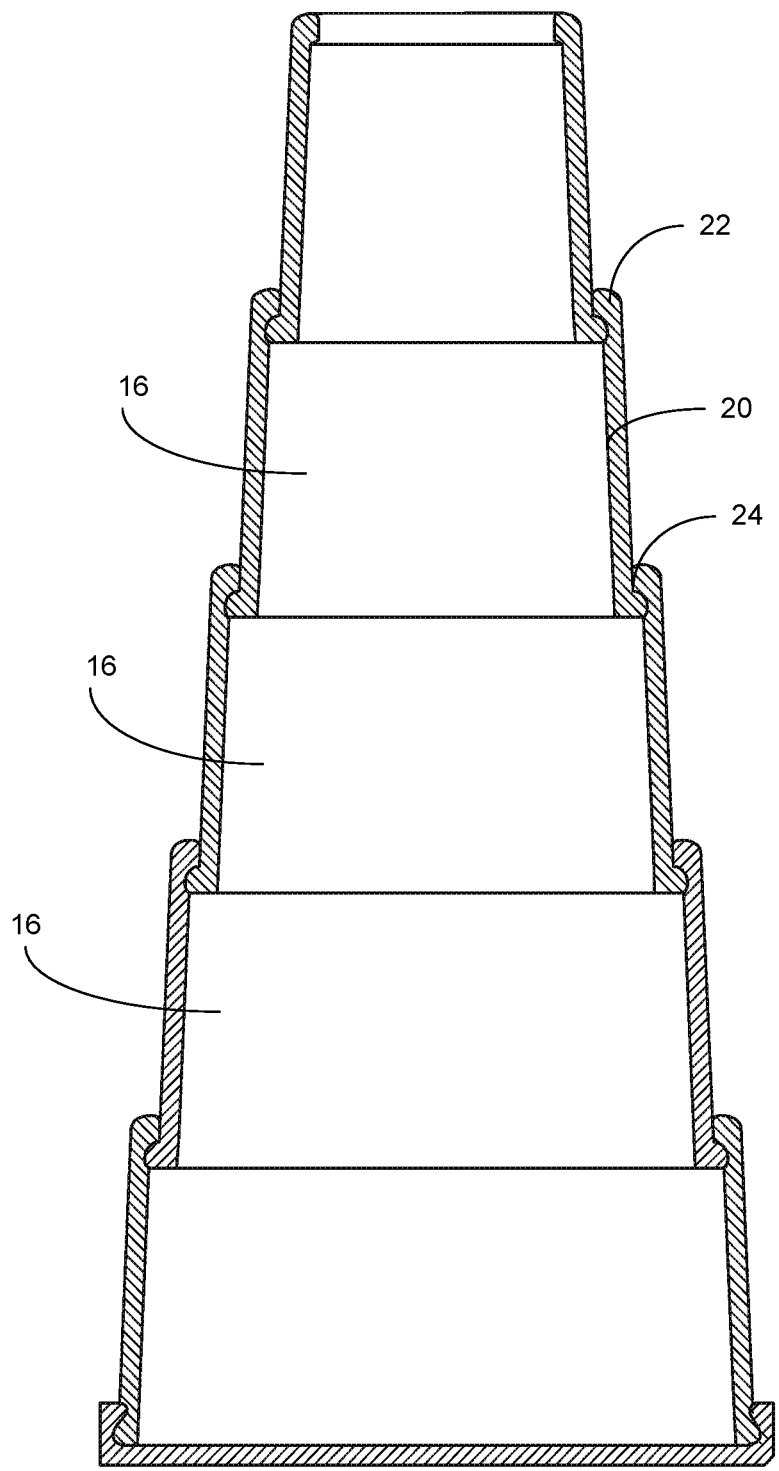
FIG. 2 is a cross-sectional view of the body of the present invention.

Referring now to the drawings submitted herewith, wherein various elements depicted therein are not necessarily drawn to scale and wherein through the views and figures like elements are referenced with identical reference numerals, there is illustrated a physical therapy apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 4:
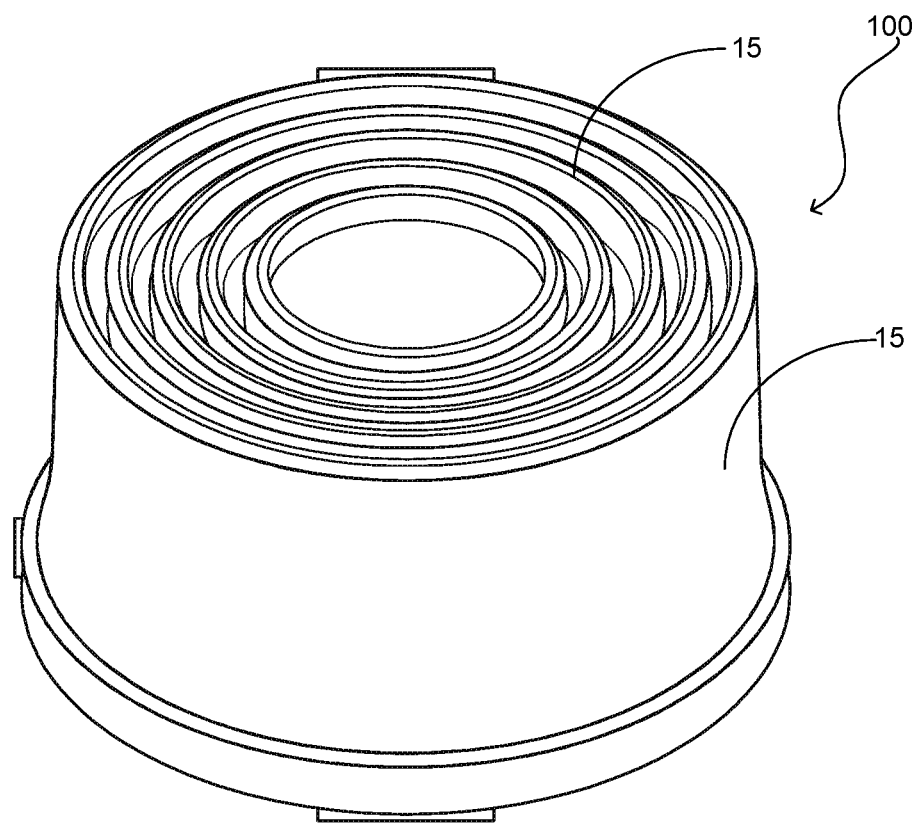
FIG. 4 is a perspective view of the present invention in a collapsed position.

Referring in particular to FIG. 1 herein, the physical therapy apparatus 100 includes a body 10. The body 10 is manufactured from a rigid lightweight material such as but not limited to plastic. The body 10 is comprised of a plurality of annular segments 15 that are slidably coupled. The segments 15 are constructed so as to have narrowing diameters to facilitate the insertion of a segment 15 into the interior volume 16 of the adjacent segment 15 beneath. The aforementioned configuration of the segments 15 provides a telescoping movement for the body 10 wherein the body 10 can have the height thereof adjusted from a fully collapsed position to a fully extended position. Furthermore, as will be discussed herein the segments are constructed to allow positioning of the body 10 at heights intermediate the fully collapsed position and the fully extended position. The fully extended position of the body 10 is illustrated herein in FIG. 1 and the fully collapsed position is illustrated herein in FIG. 4.

Figure 3:
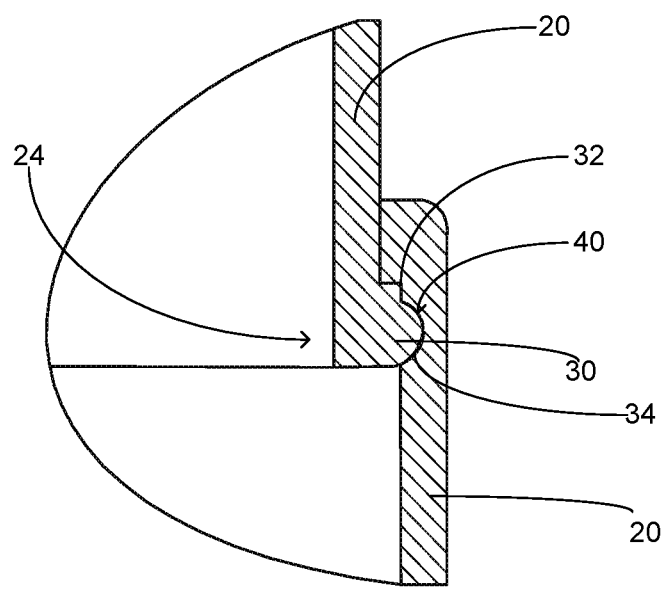
FIG. 3 is a detailed view of a segment connection of the body of the present invention.

The segments 15 include a wall 20 having a top end 22 and a bottom end 24. As shown herein in FIG. 3 the bottom end 24 of the wall 20 has a projection member 30 contiguously formed thereon. The projection member 30 extends outward from the bottom end 24 of the wall 20 and is generally perpendicular thereto. The projection member 30 functions to frictionally engage the adjacent segment 15 and provide a stopping mechanism so as to hold the segment 15 in its extended position subsequent the segment 15 being slidably traversed in an upward direction. The projection member 30 includes a semi-annular edge 34 contiguously formed with an right angle edge 32. The semi-annular edge 34 and right angle edge 32 mateably couple with a cavity 40 of the same shape formed in the interior surface 26 of the wall 20 proximate the top end 22. While a specific shape for the projection member 30 has been illustrated and discussed herein, it is contemplated within the scope of the present invention that the projection member 30 could be formed in alternate shapes and sizes and achieve the desired functionality as described herein.

While the body 10 is illustrated herein as having five segments 15, it is contemplated within the scope of the present invention that the body 10 could have as few as two segments 15 or more than five segments 15 so as to provide a body 10 of varying sizes. It is further contemplated within the scope of the present invention that the segments 15 could be formed in alternate shapes from the annular shape illustrated and described herein.

Figures 5, 6:
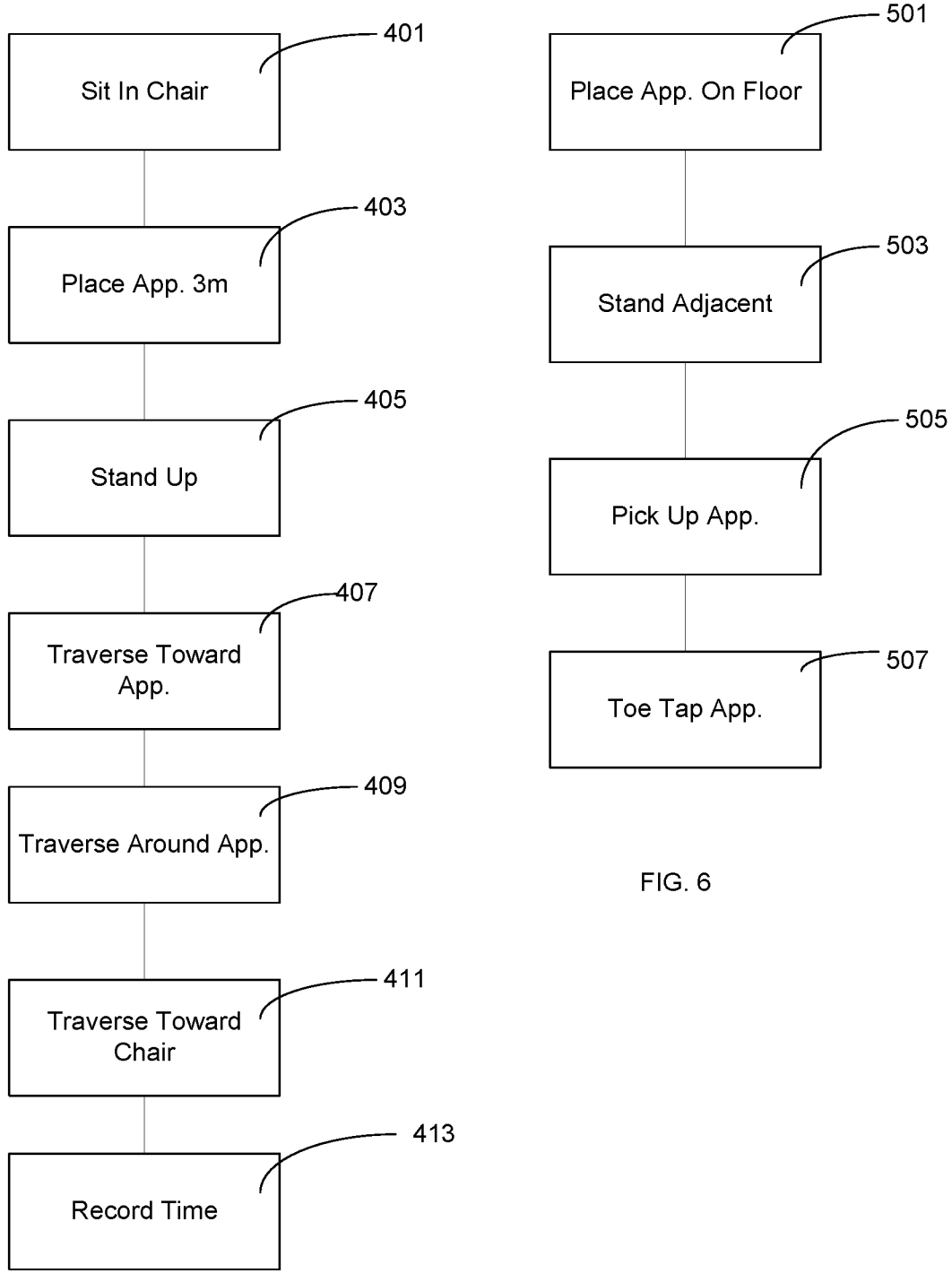
FIG. 5 is a flowchart of an exemplary method of use of the present invention.
FIG. 6 is a flowchart of an additional exemplary method of use of the present invention.

Referring to FIGS. 5 through 9 herein, exemplary methods of utilization of the physical therapy apparatus 100 are diagrammed therein. In FIG. 5, step 401 a practitioner will instruct a patient to sit in a chair. Step 403, the practitioner will place the physical therapy apparatus 100 a distance away from the chair in which the patient is seated. While no particular distance is required, good results have been achieved placing the physical therapy apparatus 100 three meters away from the seated patient. In step 405, the patient will move to a standing position. Step 407, the patient will traverse toward the physical therapy apparatus 100. In step 409, the patient will traverse around the physical therapy apparatus 100. Step 411, the patient will traverse back towards the chair. In step 413, the practitioner will record the amount of time required by the patient to perform steps 405-411.

Referring to FIG. 6, in step 501 the practitioner will place the physical therapy apparatus 100 on a floor. The physical therapy apparatus 100 can be in either a collapsed, partially extended or fully extended position. Step 503, the patient will stand adjacent to the physical therapy apparatus 100. In step 505, the patient will pick up the physical therapy apparatus 100. Step 507, the patient can alternatively leave the physical therapy apparatus 100 on the floor and tap the top of the physical therapy apparatus 100 with one foot while balancing on the opposing foot.

Referring to FIG. 7, in step 601 the practitioner will position a patient in a desired location on a floor in a standing position. Step 603, the practitioner will place a first physical therapy apparatus 100 a distance away from the patient. In step 605, the practitioner will place a second physical therapy apparatus 100 a distance that is farther away from the patient than the first physical therapy apparatus 100. Step 607, the patient will traverse to the right side of the first physical therapy apparatus 100. In step 609, the patient will traverse to the left side of the second physical therapy apparatus 100. Step 611, the practitioner will observe and evaluate the patient's balance during the performance of steps 607 and 609. In step 613, the practitioner will record observations from step 607 and 609.

Now referring to FIG. 8 submitted as a part hereof, in step 701 a practitioner will position a patient in a standing position. Step 703, a first physical therapy apparatus 100 will be placed two meters away from patient. In step 705, a second physical therapy apparatus 100 will be placed at a distance that is farther away from the patient than the first physical therapy apparatus 100. It is contemplated within the scope of the present invention that the physical therapy apparatus 100 could be placed varying distances away from the patient in steps 703 and 705. By way of example but not limitation, step 703 could have the physical therapy apparatus 100 two meters away from the patient. Additionally, for step 705 it is contemplated within the scope of the present invention that the second physical therapy apparatus 100 could be placed three to ten meters away from the patient. In step 707, the patient traverses towards and begins to pass the first physical therapy apparatus 100. Step 709, the practitioner records the time of arrival at the first physical therapy apparatus 100. In step 711, the patient continues traversing towards the second physical therapy apparatus 100. Step 713, the practitioner records the time of arrival at the second physical therapy apparatus 100. In step 715, the practitioner records and evaluates the gait speed of the patient intermediate the first physical therapy apparatus 100 and the second physical therapy apparatus 100.

Figure 9:
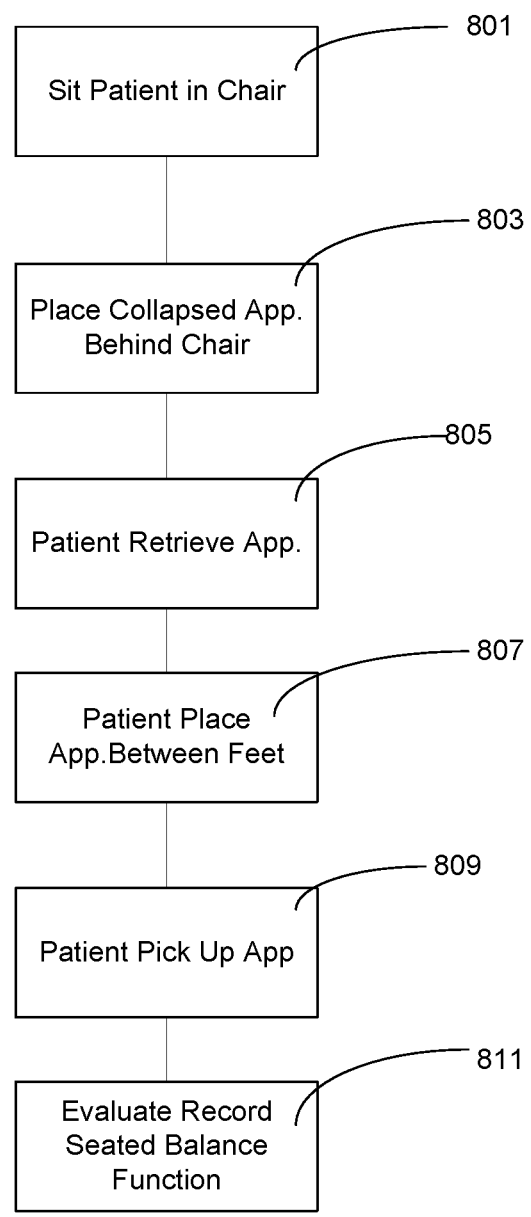
FIG. 9 is a flowchart of an additional exemplary method of use of the present invention.

Referring in particular to FIG. 9, in step 801 a practitioner will have a patient sit in a chair. Step 803, a physical therapy apparatus 100 will be placed behind the chair in which the patient is seated. It is contemplated within the scope of the present invention that the physical therapy apparatus 100 could be in a collapsed, partially extended or extended position. In step 805, the patient will rotate and retrieve the physical therapy apparatus 100 placed behind them. Step 807, the patient will place the physical therapy apparatus 100 intermediate their feet. In step 809, the patient will pick up the physical therapy apparatus 100. Step 811, the practitioner will evaluate and record the seated balance function of the patient as observed in step 805 through step 809.

A listing of additional methods of use for the physical therapy apparatus 100 are as follows. The subsequent list of methods are exemplary in manner and are not intended to be limiting. It is contemplated within the scope of the present invention that the ensuing methods/uses can either be performed solely or in some combination. By way of example but not limitation the physical therapy apparatus 100 could be placed in front of a standing patient wherein the patient is requested to reach for the physical therapy apparatus 100. Alternatively, a physical therapy apparatus 100 could be placed adjacent to a standing patient and the patient is required to tap the top of the physical therapy apparatus 100 with one foot while balancing on the opposing foot. It is further contemplated within the scope of the present invention that the immediately aforementioned could be executed with the patient in a seated position or with the patient standing on a surface such as but not limited to a foam mat. Furthermore, the physical therapy apparatus 100 the patient can engage the top of the physical therapy apparatus 100 ensuing being placed in its extended position and slidably traverse their hands towards the bottom of the physical therapy apparatus 100. Additionally, the physical therapy apparatus 100 could be placed in one of the aforementioned positions and the patient could be instructed to repeatedly step over the physical therapy apparatus 100. Alternatively, a ball or other suitable item could be placed on top of the physical therapy apparatus 100 wherein the patient is instructed to kick the ball so as to remove from the top of the physical therapy apparatus 100 without disrupting the standing position of the physical therapy apparatus 100. Additionally, the patient is placed in a seated or standing position and is required to repeatedly collapse and extend the physical therapy apparatus 100. Lastly, the patient can be placed in a standing position adjacent to a physical therapy apparatus 100 that is placed on its side wherein the patient will roll the physical therapy apparatus 100 under their foot while maintain balance with the opposing foot. It should be understood within the scope of the present invention that the physical therapy apparatus 100 could be disassembled and reassembled as part of a physical therapy routine or evaluation.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A physical therapy method of using a system configured to facilitate examination and intervention of a patient wherein the physical therapy method of using the system comprises:

providing at least one physical therapy apparatus, said at least one physical therapy apparatus having a body, said body having a plurality of segments, said body having a bottom end and a top end, said plurality of segments having a wall, said wall defining an interior volume of each of said plurality of segments, said plurality of segments being telescopically coupled, said plurality of segments having a decreasing diameter from said bottom end of said body to said top end of said body, said body having a first position and a second position, wherein in said first position of said body said plurality of segments are in a collapsed position, wherein in said second position of said body said plurality of segments are telescopically extended, wherein said body has a diameter that is greater proximate said bottom end of said body than said top end of said body;

positioning a patient, wherein the patient is placed in a first position or a second position, wherein said first position is a seated position and said second position is a standing position;

placing the at least one physical therapy apparatus proximate the patient, wherein the at least one physical therapy apparatus is placed so as to be within reach of the patient or within walking distance for the patient;

providing instructions by a practitioner to a patient to perform a plurality of physical movements related to a physical therapy routine or assessment by engaging only the at least one physical therapy apparatus such that no additional objects are required to perform said instructions;

performing by the patient the plurality of physical movements related to the physical therapy routine or assessment by engaging the at least one physical therapy apparatus wherein no object is positioned on said at least one physical therapy apparatus during said movements by the patient;

evaluating by the practitioner at least one of the plurality of physical movements by the patient engaging the at least one physical therapy apparatus in order to ascertain ability level; and based on the evaluating step, providing by the practitioner a physical therapy plan to the patient.

2. The physical therapy method of using the system as recited in claim 1, and further including placing a first physical therapy apparatus of the at least one physical therapy apparatus approximately two meters in front of a standing patient.

3. The physical therapy method of using the system as recited in claim 2, and further including placing a second physical therapy apparatus of the at least one physical therapy apparatus in front of a standing patient at a distance that is greater than that of the distance between the patient and the first physical therapy apparatus.

4. The physical therapy method of using the system as recited in claim 1, wherein one of said plurality of movements by the patient includes standing adjacent to the at least one physical therapy apparatus and placing one foot on top of said body of said at least one physical therapy apparatus.

5. The physical therapy method of using the system as recited in claim 1, wherein one of said plurality of movements by the patient includes traversing towards and subsequently around said at least one physical therapy apparatus.

6. The physical therapy method of using the system as recited in claim 1, and further including grasping the at least one physical therapy apparatus with a patient's hands proximate the top end of the body of said at least one physical therapy apparatus and slidably moving the patient's hands towards the bottom end of the body of said at least one physical therapy apparatus.

\* \* \* \* \*